Fig. 1

INVENTORS
OTTO E. JOHNSON
ROLAND J. FRASE
JAMES MORKOSKI

United States Patent Office 3,321,027
Patented May 23, 1967

3,321,027
SELF-RESTORING PLOW TRIP
Otto E. Johnson, Hinsdale, Roland J. Frase, Palatine, and James Morkoski, Clarendon Hills, Ill., assignors to International Harvester Company, Chicago, Ill., a corporation of Delaware
Filed Aug. 26, 1965, Ser. No. 482,704
11 Claims. (Cl. 172—266)

This invention relates to earth working implements and particularly to safety trip mechanism therefor.

The mounting of plows and the like for tripping under abnormal draft conditions to avoid damaging the plow is well known, and a typical trip plow is able to swing rearwardly and upwardly, when resistance is encountered, until the obstacle has been passed. In the past such plows have not been able to reset themselves but have required the operator to perform this function manually or to back up the implement and thus force the plow to return to its operating position. Attempts to provide self-restoring plows to eliminate the loss of time required in backing the tractor and plow have been only partly successful in returning the plow from its tripped position, since they usually required lifting the entire implement before the plow could reset itself, or they have required the application of hydraulic cylinders to literally force the plow bottom to penetrate the soil and return to its normal position.

One of the principal reasons for failure of a tripped plow to restore itself has been its angular disposition with respect to the ground at the point of re-entry. The result has been that the point of the plow has merely scraped the surface of the ground until the operator backed up or lifted the entire implement so that the plow could return to a favorable position for re-entry. Therefore, an object of this invention is the provision of novel tripping mechanism for an earth working tool.

Another object of the invention is the provision of novel tripping mechanism for plows and the like which avoids damage to the earth working tool when obstructions or other abnormal plowing conditions are encountered and automatically restores the plow unit from its tripped to its operating position without interrupting forward progress.

Another object of the invention is the provision of an improved implement trip wherein the plow bottom or other tool is carried from the supporting frame by generally parallel links which are biased downwardly to permit the plow to rise and fall without tripping, and which also permit the plow to trip to an inoperative position when abnormal draft conditions are encountered.

When an implement such as a plow is lowered from a transport position to begin a plowing operation the individual plow bottom is suitably pitched or is disposed in a favorable attitude with respect to the ground so that, upon propelling the implement forwardly the point of the plow bottom, and of each plow bottom in a multibottom plow, enters the ground and continues to penetrate until the desired depth is reached. Assuming that a plow bottom encounters an obstruction and trips to an inoperative position above the ground, conventional tripping mechanism causes the tripped bottom to follow the same path as it returns, and the returning bottom is pitched at such a large angle with respect to the ground line that the forward motion of the propelling vehicle will not pull it into the ground. Therefore, the present invention has for another of its objects to proved novel tripping mechanism for implements such as plows and the like wherein provision is made for disposing the tripped plow bottom in a favorable attitude for normal re-entry into the ground without interrupting the forward progress of the implement.

Other objects and advantages of the invention will become clear from the following detailed description when read in conjunction with the accompanying drawings wherein.

In the drawings the numeral 10 designates the implement supporting frame which includes a diagonally extending backbone or beam 11 upon which may be mounted one or more plowing units 12.

The supporting framework also includes a generally U-shaped bracket 13 affixed to the underside of beam 11, and another bracket 14, U-shaped in cross-section, affixed to and projecting upwardly from the beam 11.

A pair of pivot bolts 15 are mounted in the upper ends of the arms of U-shaped bracket 14, and have mounted thereon the forward ends of link members 16. A pivot shaft 17 is mounted between the depending portions of bracket 13, and has affixed thereto, as by welding, the forward end of a link 18 which comprises a forward portion 19 and a downwardy angled rear portion 20.

The earth working plow unit 12 includes a generally vertically extending standard 21 upon the lower end of which is mounted a moldboard plow bottom 22. A lug 23 affixed to the rear of standard 21 carries a pivot bolt 24, and the rear portion 20 of link 18 comprises spaced members straddling standard 21 and pivoted upon the ends of bolt 24.

The upper end of standard 21 carries an elongated pivot bolt 25 upon which are mounted the rear ends of link members 26.

Members 16 and 26 constitutes an upper link assembly 27 in the form of a toggle, the spaced elements of which are pivotally interconnected by spaced bolts 28, the toggle 27 forming with link 18 the upper and lower links of a generally parallel link system by which tool standard 21 and plow bottom 22 are mounted on the implement frame.

Figure 1:
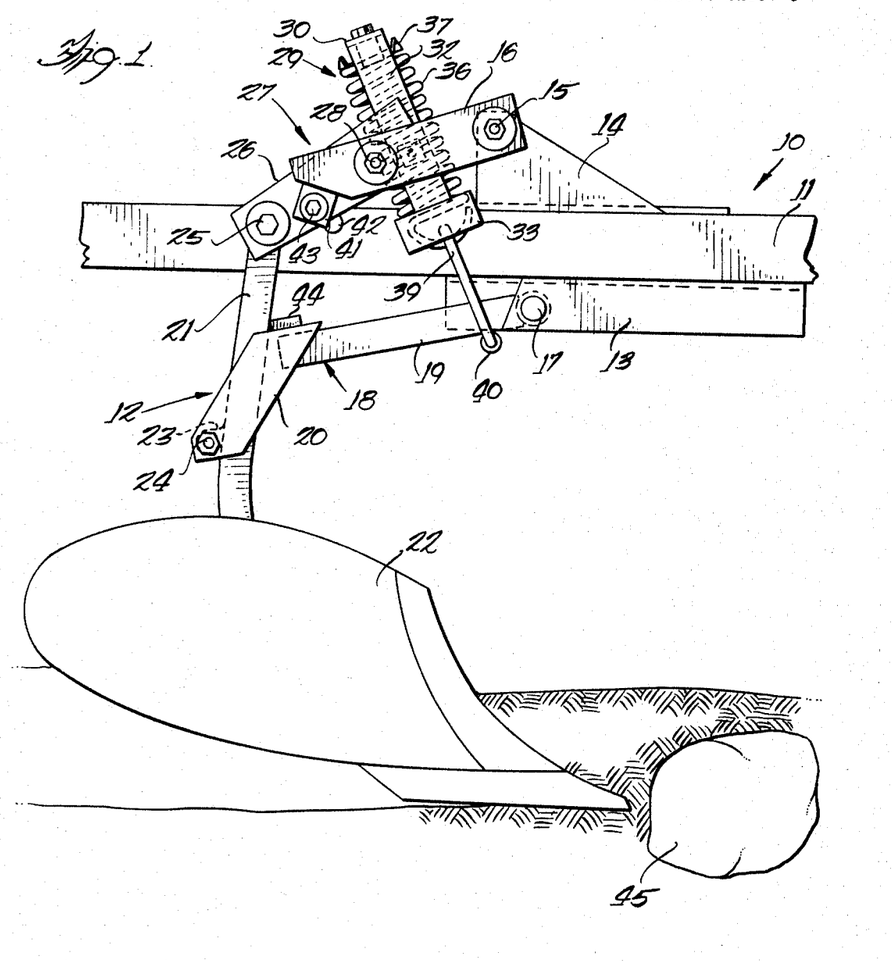
FIGURE 1 is a view in side elevation of a portion of a plow frame carrying a plowing unit thereon by means incorporating the subject of this invention.
Figure 2:
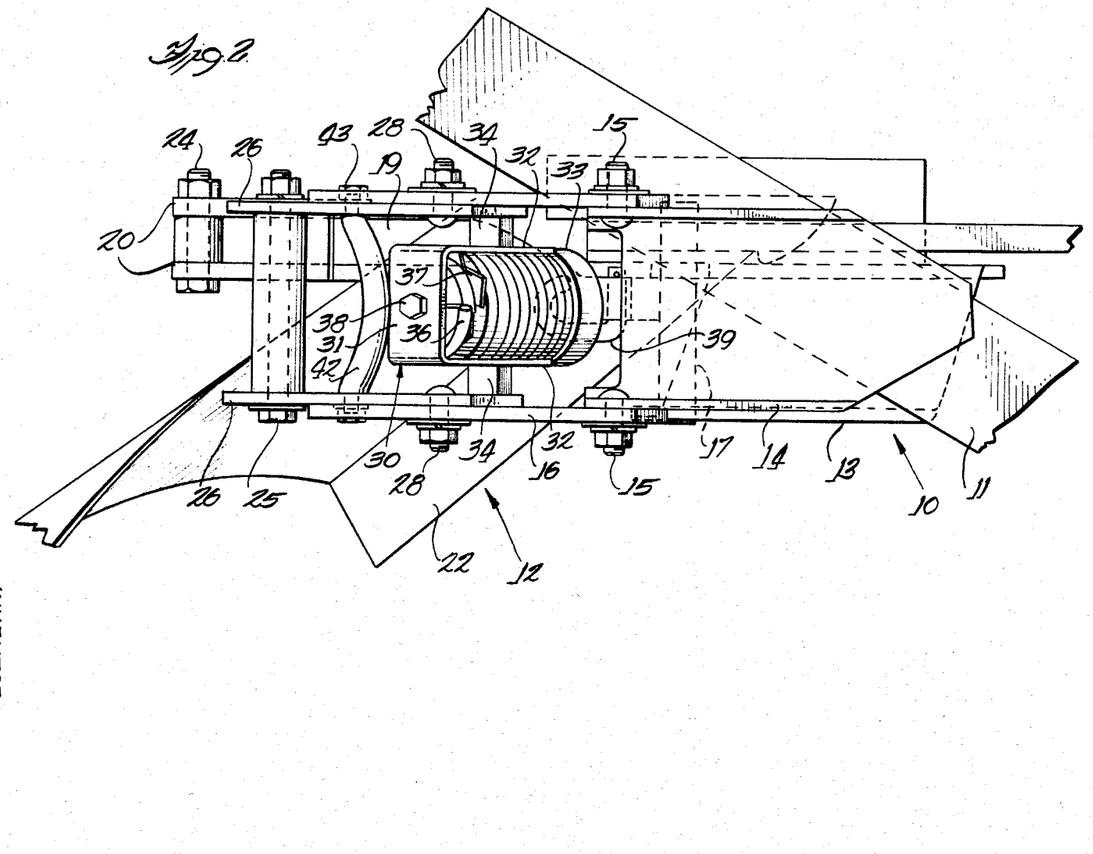
FIGURE 2 is a plan view on a larger scale of the structure shown in FIGURE 1.

The fulcrum 28 of toggle 27 is biased toward, but maintained short of an on-center relation with respect to the pivot axes of bolts 15 and 25 by a spring assembly 29 comprising a yoke 30 having an upper bight portion 31 and side arms 32 to the lower ends of which is secured a ring 33, arms 32 having secured thereto pivot blocks 34 pivotally connected by pins 35 to the forward ends of members 26.

Yoke 30 encloses a coil spring 36, the upper end of which is anchored to a washer 37 which is adjustably secured by a bolt 38 with the bight portion 31 of the yoke. The lower end of spring 36 is anchored to the hook shaped upper end of a rod 39, the lower end of which is bent laterally for pivotal reception in a sleeve 40 affixed to the lower surface of lower link 18 near its forward end adjacent pivot 17 and bracket 13.

Tension on spring 36 can be adjusted by means of bolt 38 to increase or decrease the spring pressure that must be overcome in order to break the toggle 27. Movement of the toggle members 16 and 26 toward an on-center relation as indicated in FIGURE 1, is limited by the provision of an eccentric block 41 mounted on a curved bracing bar 42 extending between the toggle link members 26, link member 16 having a flattened edge engageable with the sides of eccentric block 41 to adjust the position of pivot axes 28 relative to axes 15 and 25. Each end of bar 42 is threaded to receive a nut 43 to hold block 41 in place.

By virtue of the suspension of standard 21 and plow bottom 22 from the implement frame by the vertically spaced generally parallel links 27 and 18, the plow bottom and its standard are capable of vertical movement in a generally straight path without breaking the toggle 27 by pivoting of the links 27 and about the respective pivots 15 and 17 on the brackets 15 and 13. This action makes it possible for the plow bottom 22 to avoid damage thereto from obstacles directing a force vertically upwardly against the bottom of the plow. Such movement is against the action of spring 36 which biases the plow unit 12 downwardly. The plow bottom thus simply rides over such obstacles without the damage which occurs when the plow unit is rigidly mounted on its supporting frame.

The plow unit is further limited in its downward movement by the provision of a stop 44 affixed to members 20 and engaging standard 21.

Figure 3:
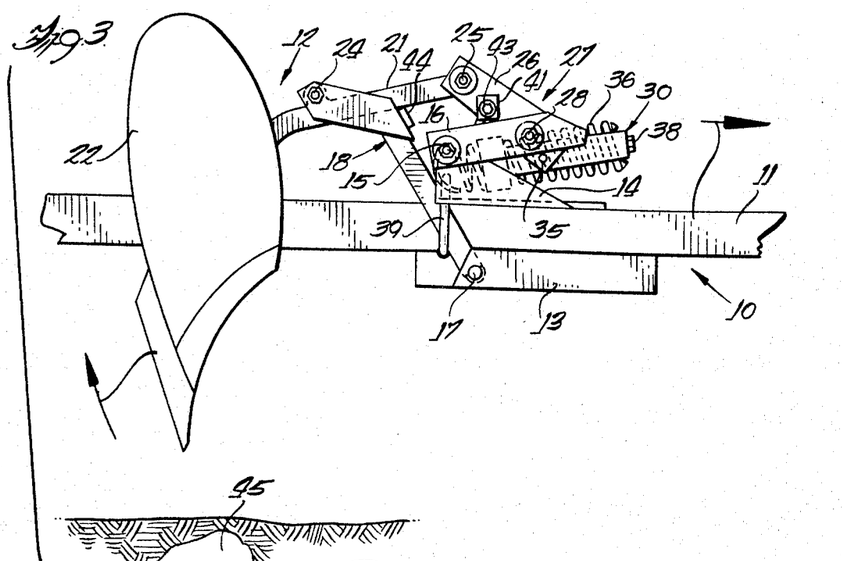
FIGURE 3 is a view similar to FIGURE 1, on a smaller scale, showing the plow unit in its fully tripped position.

Upon the plow bottom 22 engaging an obstruction such as shown at 45 in FIGURE 1, in the manner indicated, a force is directed rearwardly against the plow bottom to swing it rearwardly and upwardly about the pivot axes of bolt 15 and shaft 17. However, the upper link or toggle 27 is placed under compression by such a load and immediately begins to collapse or break, pivot bolt 28 moving toward greater off-center relationship with respect to pivot bolts 15 and 25 and the unit trips to the inoperative position of the plow bottom 22 shown in FIGURE 3. As the compressive load upon the plow bottom 22 and, through standard 21, on upper link 27 is sufficient to break the toggle in the upper parallel link, the plow bottom and standard 12 revolve to the fully tripped position about the axis of the lower link. As the plowing unit 12 moves through its tripping cycle and plow bottom 22 leaves the ground, the downward force exerted by the spring 36 drops substantially to zero, and upon further collapse of links 16 and 26, the spring moves to a position where it actually exerts an upward force tending to lift the plow unit. When the lower link 18 reaches its upper limit of rotation about shaft 17, toggle 27 is fully collapsed as shown in FIGURE 3, link 18 engaging bracket 14 and standard 21 engaging stop 44. However, this position is momentary since the weight of the plow bottom 22 and the action of spring 36 combine to straighten the toggle 27 and return pivot bolt 28 toward its on-center relation with respect to pivots 15 and 25, standard 21 and plow bottom 22 pivoting counterclockwise about the pivot axis of bolt 24. This can be seen in FIGURE 3 where the pull of the spring acting upon the forwardly projecting end of link 26 at pivot 35 exerts a force in a direction to rock link 26 about its pivot 28. Since standard 21 engages stop 44, pivot 25 can only move upwardly and rock the standard about pivot 24, re-setting the plow as in FIGURE 4.

Were the plow bottom 22 to return from its tripped position and engage the ground in the customary manner with tripped plows, in the position of the plow bottom indicated in FIGURE 3, the plow unit would simply bounce up and down on the surface of the ground. As pointed out hereinbefore, for the plow to be returned to its operating position would require that the implement frame be lifted or that the implement be backed up with the plow bottom engaging the ground until it returned to its normal operating position, or would require the kind of power supplied by hydraulic cylinders and the like. It is well known that a moldboard plow bottom seeks its own depth in the ground depending upon the line of draft from the propelling vehicle, and that when the plow bottom approaches the surface of the ground at a favorable angle with respect thereto, the point of the plow is pulled downwardly by its forward progress until it reaches its level of operation. The rocking of the standard 21 and plow bottom 22 about the axis of pivot bolt 24 at the beginning of the return cycle, therefore, disposes the plow bottom 22 at a substantially lesser angle than that shown in FIGURE 3 with respect to the ground, so that the return cycle is completed with the plow bottom 22 at a shallow angle relative to the ground and in position for entering the ground and automatically returning to its operating depth without interrupting the forward motion of the implement.

As the upper or toggle link 27 straightens, the lever arm supplied by spring 36 shifts so that the plow unit is again biased thereby to return to the ground.

Figure 5:
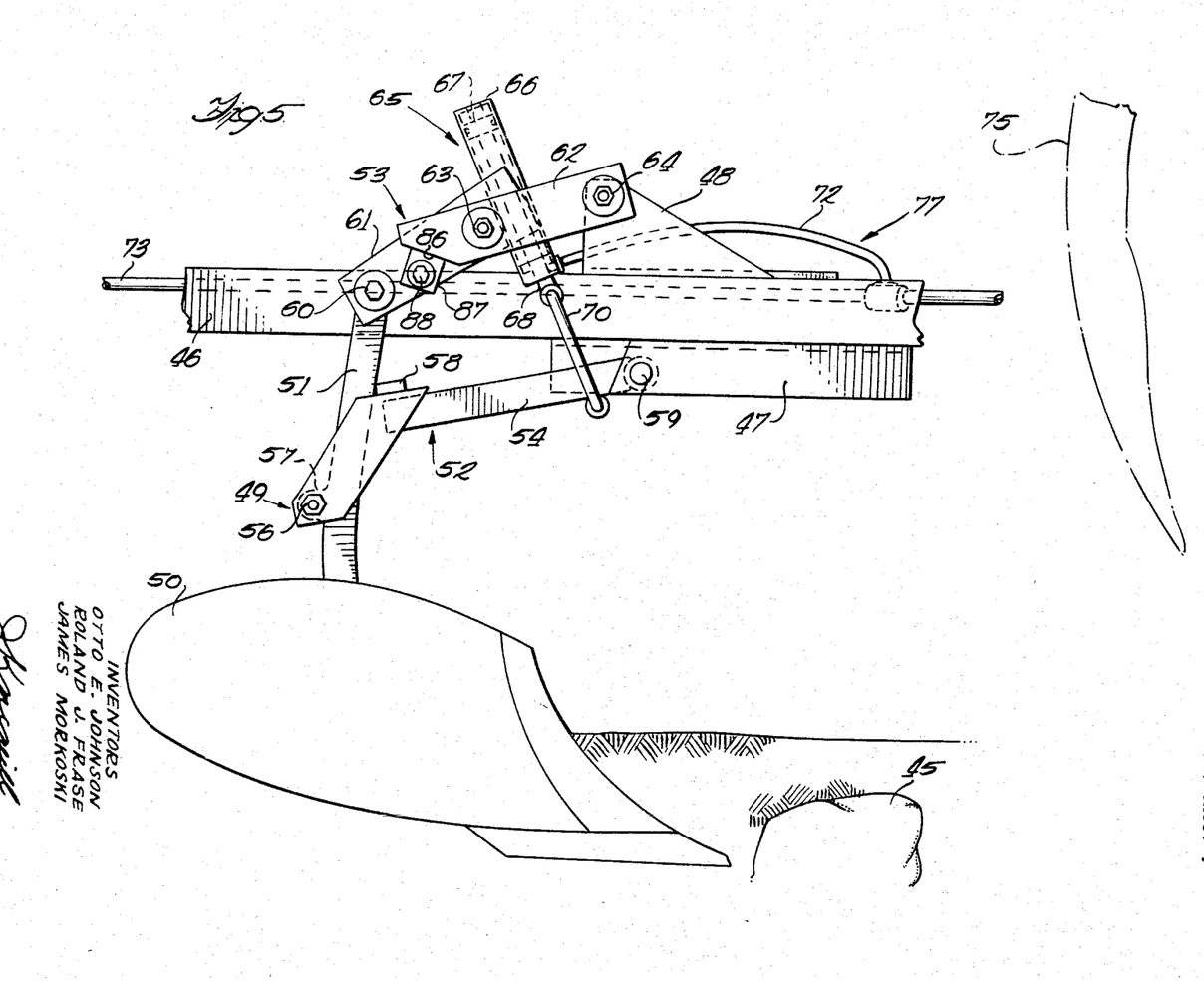
FIGURE 5 is a view similar to FIGURE 1, showing a modified form of the invention.
Figure 6:
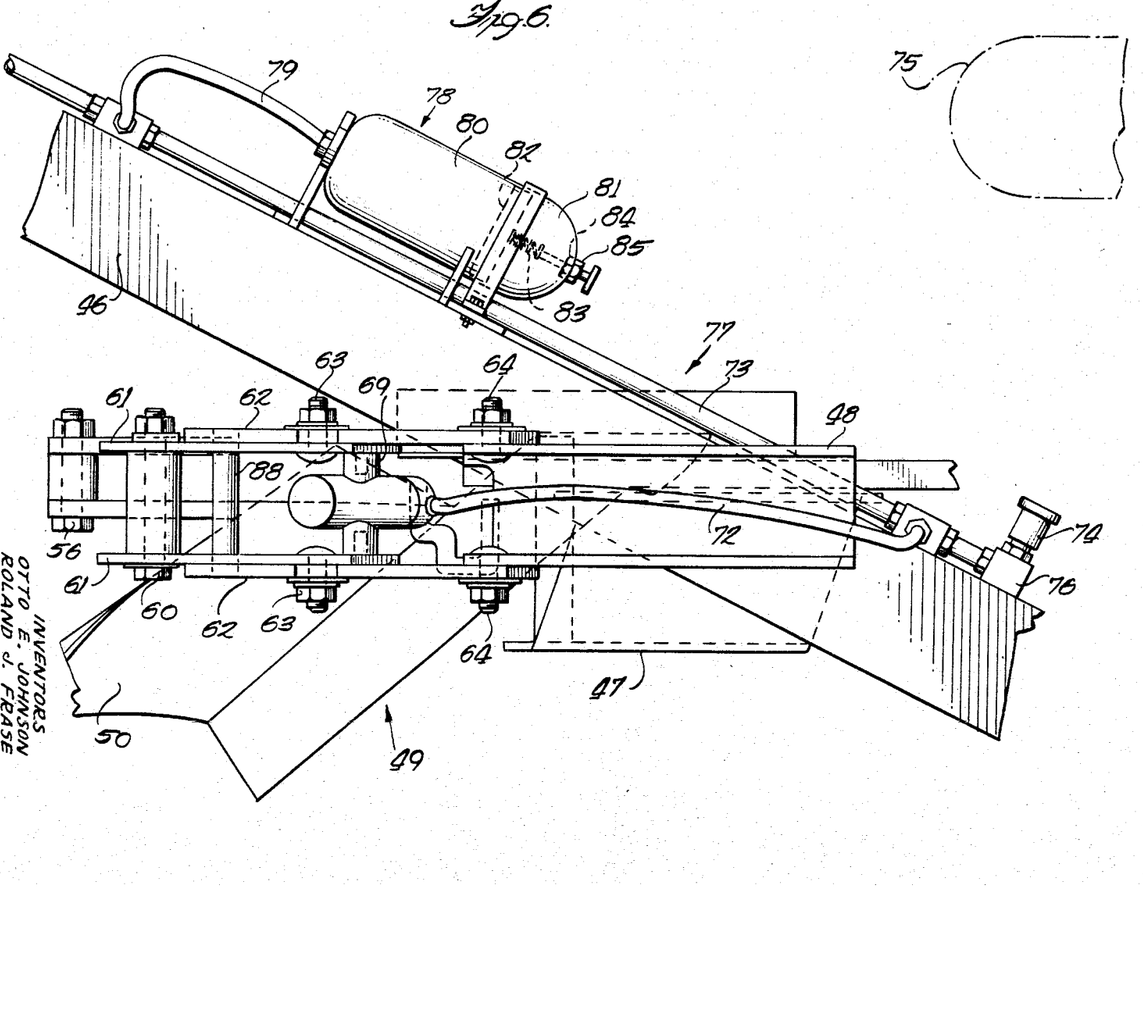
FIGURE 6 is a plan view of the structure shown in FIGURE 5.

In the modified form of the invention shown in FIGURES 5 and 6, the diagonal beam 46 of the supporting frame has secured thereto lower and upper brackets 47 and 48, both generally U-shaped in cross-section. Brackets 47 and 48 provide the means by which a plow unit 49 is mounted on the implement frame, the plowing unit comprising a plow bottom 50 secured to the lower end of a generally vertically extending standard 51, which is mounted on the implement frame for vertical movement relative thereto by means of generally parallel link members 52 and 53. Lower link 52 comprises a forwardly extending portion 54 and a downwardly angle rear portion 55 including spaced members straddling standard 51 and pivoted upon a bolt 56 carried by a lug 57 secured to the standard.

The upper end of lower link section 55 has secured thereto a stop member 58 engageable with the forward edge of standard 51 to limit downward movement of the plow unit, and the forward end of section 54 of lower link 52 is affixed to a transverse pivot shaft 59 carried by bracket 47.

A pivot bolt 60 is carried at the upper end of standard 51, and upon the ends of bolt 60 are mounted the rear ends of laterally spaced link members 61.

Upper generally parallel link 53 is in the form of a toggle of which link members 61 form a part, the other part of the toggle comprising spaced link members 62, which are pivotally interconnected with members 61 by pivot bolts 63, and the forward ends of which are mounted on pivot bolts 64 carried by bracket 48. The fulcrum 63 of togggle 53 is yieldably urged toward but maintained short of an on-center relation with respect to the pivot axes of bolts 60 and 64 by means of a hydraulic power unit 65 comprising a cylinder 66 having a piston 67 and a rod 68 slidable therein, the cylinder 66 being provided with trunnions 69 for pivotal mounting between the forward ends of toggle link elements 61.

The outer end of piston rod 68 is provided with an opening to receive the upper hooked end of a rod 70, the lower end of which is bent laterally for pivotal reception in a sleeve 71 affixed to the lower surface of lower link 52 near its forward end adjacent pivot 59 and bracket 47 of the implement frame.

In the operating position of the parts shown in FIGURE 5, it will be noted that the piston is at the upper end of the cylinder which is filled with oil supplied through a hose line 72 connected to a pipe 73 mounted on the implement frame parallel to diagonal beam 46, and provided with a coupling 74 for connection with the hydraulic system, not shown, of a tractor indicated at 75. A check valve 76 of any well-known construction is provided between coupling 74 and pipe 73 to hold fluid in the hydraulic circuit on the implement, the coupling 74 being self-sealing and adapted for connection to the tractor hydraulic system to recharge the circuit when needed.

The entire hydraulic circuit on the implement is designated by the numeral 77 and includes an accumulator 78 shown diagrammatically in FIGURE 6 connected to pipe 73 by an oil hose 79 and having an oil filled space 80 and an air space 81 separated by a wall 82 engaged by a spring 83, to the other end of which is attached one end of a bolt adjustably received in an opening in the end of the accumulator housing and adjustably locked in position by nuts 84 and 85.

Cushioning of the plow unit 49 is provided through the intermediary of the hydraulic cylinder 65 to permit the plow unit to rise vertically about the pivots 59 and 64 of the generally parallel links 52 and 53, respectively, on the plow frame. In the operating position, fulcrum 63 between links 61 and 62 approaches an on-center relation, and this relationship is adjustable by providing a flattened edge 86 on links 62 engageable with a block 87, one of which is mounted on each end of a shaft 88, the block 87 being eccentric and rotatable to adjust the relationship of fulcrum 63 to pivots 60 and 64.

Generally vertical cushioned movement of the plow unit 49 is accommodated, fluid being expressed from cylinder 66 back to the accumulator 78, causing wall 82 to compress spring 83. The accumulator 78 returns the fluid under pressure to the cylinder to urge the plow unit downwardly.

Figure 4:
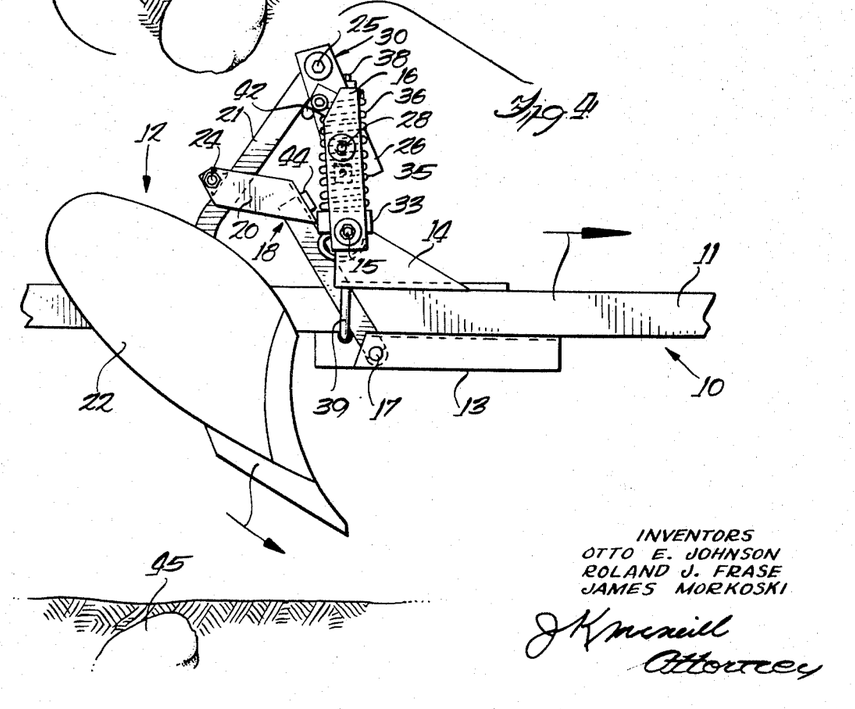
FIGURE 4 is a view similar to FIGURE 3 after the plow unit has completed its tripping cycle and a portion of its return cycle.

When the plow bottom 50 encounters an obstruction, as in the case of the spring in FIGURES 1 to 4, the plow trips to the position shown in FIGURE 3, and at the beginning of the return cycle of the plow unit, the latter is automatically reset in the attitude shown in FIGURE 4, at which point it is suitably pitched so that upon return of the plow bottom into engagement with the ground, the continued forward motion of the tractor and implement pulls the bottom into the ground and causes it to return to its normal operating depth.

It is believed that the construction and operation of the novel self-restoring plow trip of this invention will be clearly understood from the foregoing description. It should likewise be understood that the invention has been described in its preferred embodiment and that modifications may be made therein without departing from the spirit of the invention or the scope of the appended claims.

What is claimed is:

1. In an implement having a supporting frame, an earth working tool, means mounting the earth working tool on the frame accommodating tripping of the tool from an operating position below the ground when abnormal draft forces are encountered to a tripped position above the ground and return of the tool to its operating position, the mounting of said tool on the frame including link means having collapsible elements movable from an uncollapsed condition in the operating position of the tool to a collapsed condition in the tripped position of the tool, and means effective to return said collapsible elements to their uncollapsed condition prior to re-entry of the tool into the ground.

2. In a plowing implement having a traveling support adapted to be connected to and propelled by a tractor, a plow unit, means mounting the plow unit on the support for tripping thereof from a normal operating position below the surface of the ground to a tripped position above the ground when abnormal draft conditions are encountered while maintaining the vertical position of said traveling support substantially unimpaired, and means in the mounting of said plow unit on the support accommodating automatic return of the plow unit from its tripped position and effective to dispose the plow unit in an attitude conducive to penetration of the plow unit into the ground and return thereof to its normal operating position below the surface of the ground by the propulsive power of the tractor, and without interrupting the forward progress of the implement, said means mounting the plow unit on the support including link means having collapsible elements movable from an uncollapsed condition in the operating position of the plow unit to a collapsed condition in the tripped position of the plow, and means effective to return said collapsible elements to their uncollapsed condition prior to re-entry of the plow unit into the ground.

3. The invention set forth in claim 2, wherein said means in the mounting of said plow unit on the support accommodating return of the plow unit from its tripped position includes a cushion spring opposing the tripping of the plow unit.

4. The invention set forth in claim 2, wherein said means in the mounting of said plow unit on the support accommodating return of the plow unit from its tripped position includes a hydraulic cylinder having fluid therein opposing the tripping of the plow unit.

5. In an implement having a traveling support adapted to be connected to and propelled by a tractor, a plurality of plow units carried by the support, means mounting each of said plow units on the support for independent tripping of one of said plow units from a normal operating position below the surface of the ground to a tripped position above the ground when abnormal draft conditions are encountered thereby during forward progress of the implement while maintaining substantially unimpaired the normal operating position of the other of said plurality of plow units, and means in the mounting of said plow units on the support accommodating the return of the tripped unit from its tripped position and effective to dispose the tripped plow unit in an attitude conducive to penetration of said plow unit into the ground and return thereof to its normal operating position in response to the forward progress of the implement, said means mounting each of the plow units on the support including link means having collapsible elements movable from an uncollapsed condition in the operating position of said plow units to a collapsed condition in the tripped position of said tripped plow unit, and means effective to return the collapsible elements of said tripped plow unit to their uncollapsed condition prior to re-entry of said tripped plow unit into the ground.

6. A self-restoring trip plow comprising a supporting frame, a plow-carrying standard, vertically spaced generally parallel links pivotally connected at their forward ends to the supporting frame and at their rear ends to said standard, said plow standard being vertically swingable between an operating and a tripped position when an abnormal draft load is encountered, one of said links including toggle elements movable from a generally on-center relation in the operating position to an off-center relation in the tripped position of the plow, and means associated with said links and operative in the tripped position of the plow-carrying standard to restore said toggle elements to their on-center relation prior to return of the plow to its operating position.

7. The invention set forth in claim 6, wherein said means operative to restore said toggle elements to their on-center relation is spring means operatively connected to said toggle elements for biasing them to on-center relation.

8. The invention set forth in claim 6, wherein said means operative to restore said toggle elements to their on-center relation is a hydraulic cylinder device operatively connected to said toggle elements for biasing them to on-center relation.

9. A self-restoring trip plow comprising a supporting frame, a plow-carrying standard, vertically spaced generally parallel links pivotally connected at their forward ends to the supporting frame and at their rear ends to said standard, said plow standard being vertically swingable between an operating and a tripped position when an abnormal draft load is encountered, one of said links including toggle elements movable from a generally on-center relation in the operating position to an off-center relation in the tripped position of the plow, and means associated with said links and operative in the tripped position of the plow carrying standard to restore said toggle elements to their on-center relation prior to return of the plow to its operating position, said restoring means including biasing means operatively connected between the frame and said toggle elements to bias the latter to their on-center relation.

10. The invention set forth in claim 9, wherein said biasing means is effective in the operating position of the plow to maintain said toggle elements in their on-center relation under normal draft conditions and yieldable to accommodate vertical movement of the plow about the pivots of said links on the frame while maintaining said on-center relation of said toggle elements.

11. The invention set forth in claim 9, wherein said toggle elements and said biasing means are so arranged that said toggle elements are moved to an off-center relation upon initiation of the tripping operation of the plow, whereby the plow-carrying standard is swung to its tripped position about the pivot axis of only one of said links on the frame, and the return of said toggle elements to their on-center relation in the tripped position of the plow rocks said standard about the pivot axis thereon of said one of said links prior to return of the plow to its operating position.

References Cited by the Examiner

UNITED STATES PATENTS

| | | | |
|---|---|---|---|
| 2,312,405 | 3/1943 | Haagen | 172—264 |
| 2,405,980 | 8/1946 | Sands et al. | 172—266 X |
| 2,565,668 | 8/1951 | Simpson | 172—267 |
| 3,172,481 | 3/1965 | Trollsas | 172—261 |

ABRAHAM G. STONE, *Primary Examiner.*

J. R. OAKS, *Assistant Examiner.*

REEXAMINATION CERTIFICATE (189th)

United States Patent
Johnson et al.

[11] B1 3,321,027
[45] Certificate Issued May 1, 1984

[54] SELF-RESTORING PLOW TRIP

[75] Inventors: Otto E. Johnson, Hinsdale; Roland J. Frase, Palatine; James Morkoski, Clarendon Hills, all of Ill.

[73] Assignee: International Harvester Company, Chicago, Ill.

Reexamination Request:
No. 90/000,110, Nov. 13, 1981

Reexamination Certificate for:
Patent No.: 3,321,027
Issued: May 23, 1967
Appl. No.: 482,704
Filed: Aug. 26, 1965

[51] Int. Cl.³ ............................................. A01B 61/04
[52] U.S. Cl. .................................. 172/260.5; 172/267
[58] Field of Search ............................... 172/261–269, 172/260.5, 705–711

[56] References Cited

U.S. PATENT DOCUMENTS

| | | | |
|---|---|---|---|
| 2,109,385 | 2/1938 | Garrison et al. | 97/184 |
| 2,312,405 | 3/1943 | Haagen | 97/184 |
| 2,405,980 | 8/1946 | Sands et al. | 280/33.44 |
| 2,565,668 | 8/1951 | Simpson | 97/184 |
| 2,944,613 | 7/1960 | Anderson | 172/266 |
| 3,172,481 | 3/1965 | Trollsas | 172/261 |
| 3,302,728 | 2/1967 | Sullivan et al. | 172/265 |
| 3,565,180 | 2/1971 | Arnold | 172/265 |

FOREIGN PATENT DOCUMENTS

594258 3/1960 Canada.
616673 3/1961 Canada.
635406 1/1962 Canada.

*Primary Examiner*—Richard J. Johnson

EXEMPLARY CLAIM

2. In a plowing implement having a traveling support adapted to be connected to and propelled by a tractor, a plow unit, means mounting the plow unit on the support for tripping thereof from a normal operating position below the surface of the ground to a tripped position above the ground when abnormal draft conditions are encountered while maintaining the vertical position of said traveling support substantially unimpaired, and means in the mounting of said plow unit on the support accommodating automatic return of the plow unit from its tripped position and effective to dispose the plow unit in an attitude conducive to penetration of the plow unit into the ground and return thereof to its normal operating position below the surface of the ground by the propulsive power of the tractor, and without interrupting the forward progress of the implement, said means mounting the plow unit on the support including link means having collapsible elements movable from an uncollapsed condition in the operating position of the plow unit to a collapsed condition in the tripped position of the plow, and means effective to return said collapsible elements to their uncollapsed condition prior to re-entry of the plow unit into the ground.

REEXAMINATION CERTIFICATE ISSUED UNDER 35 U.S.C. 307.

THE PATENT IS HEREBY AMENDED AS INDICATED BELOW.

AS A RESULT OF REEXAMINATION, IT HAS BEEN DETERMINED THAT:

The patentability of claims 2–11 is confirmed.

Claim 1, having been finally determined to be unpatentable, is cancelled.

* * * * *